(12) United States Patent
Reggio et al.

(10) Patent No.: US 8,295,964 B2
(45) Date of Patent: Oct. 23, 2012

(54) METHOD FOR SELECTING EQUIPMENT RESOURCES IN A MANUFACTURING PROCESS

(75) Inventors: Elena Reggio, Genoa (IT); Alessandro Raviola, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 489 days.

(21) Appl. No.: 12/545,112

(22) Filed: Aug. 21, 2009

(65) Prior Publication Data

US 2010/0057236 A1 Mar. 4, 2010

(30) Foreign Application Priority Data

Aug. 28, 2008 (EP) .................................... 08015191

(51) Int. Cl.
*G06F 19/00* (2011.01)
(52) U.S. Cl. ........... 700/102; 700/101; 700/86; 700/108
(58) Field of Classification Search ............ 700/99–108, 700/86, 97
See application file for complete search history.

(56) References Cited

U.S. PATENT DOCUMENTS

| | | | | |
|---|---|---|---|---|
| 6,790,686 B1* | 9/2004 | Purdy et al. | ..................... | 438/14 |
| 6,941,183 B1* | 9/2005 | Huang et al. | ................... | 700/101 |
| 7,610,111 B2* | 10/2009 | Lin et al. | ....................... | 700/101 |
| 7,979,151 B2* | 7/2011 | McGahay | ..................... | 700/101 |
| 2008/0097623 A1* | 4/2008 | Weatherhead et al. | ........... | 700/3 |
| 2010/0082132 A1* | 4/2010 | Marruchella et al. | ........... | 700/86 |

\* cited by examiner

*Primary Examiner* — John R. Cottingham
*Assistant Examiner* — Douglas Lee
(74) *Attorney, Agent, or Firm* — Laurence A. Greenberg; Werner H. Stemer; Ralph E. Locher

(57) ABSTRACT

A method for selecting equipment resources in a manufacturing process creates an execution equipment list by retrieving out of a database execution equipment required for starting a process segment. A list of available sub-equipments of the execution equipment is retrieved out of the database. Within the list of sub-equipments a check is performed on the availability of a totality of required equipments for each of a totality of work segments of the process segment respectively. The execution equipment is selected for the starting of the process segment. Each of the required equipments for execution of each of the work segments is selected respectively, in the case where the required equipment for the work segment is available. An output list is created and contains information about assignments of each of the required equipments to each of the work segments respectively in the case where all of the required equipments are available.

7 Claims, 1 Drawing Sheet

METHOD FOR SELECTING EQUIPMENT RESOURCES IN A MANUFACTURING PROCESS

CROSS-REFERENCE TO RELATED APPLICATION

This application claims the priority, under 35 U.S.C. §119, of European application EP 08 015 191.3, filed Aug. 28, 2008; the prior application is herewith incorporated by reference in its entirety.

BACKGROUND OF THE INVENTION

Field of the Invention

The invention relates to a method for selecting equipment resources in a manufacturing process, especially by cross-checking equipment availability within a location of the manufacturing process.

Management of information about equipment resources is an important activity controlled by a manufacturing execution system. Equipment allocation is usually performed during an engineering phase. Equipment requirements can be as generic as materials of construction or it can be as specific as a particular piece of equipment.

A standard has been defined in order to specify a flow of and an interaction between manufacturing processes. This standard, called ISA S95, is an extension by a batch mode of the ISA S88 standard for process control engineering in manufacturing, applicable for discrete and continual production types. It defines schemes for various production steps, the schemes containing rules about information exchange between different production phases required in a manufacturing execution system like: an equipment scheme, a maintenance scheme, a production schedule, etc.

In order to put into practice the concepts defined in the ISA S95 standard, an XML implementation, known as B2MML, of the ISA 95 family of standards, known internationally as IEC/ISO 62264 has been provided. B2MML consists of a set of XML schemas written using the World Wide Web Consortium's XML Schema language (XSD) that implement the data models in the ISA S95 standard. B2MML is used to integrate business systems and supply chain management systems with manufacturing systems such as control systems and manufacturing execution systems. B2MML is a complete implementation of the ISA S95.

One issue related to a production process in manufacturing execution systems (MES) is the fact that, in a dispatching phase, before addressing an execution of a work segment to a piece of equipment, the MES system has to verify an availability of the piece of equipment, in other words it has to be made sure that production equipment resources required by a process segment of a work segment are provided.

The process segment is defined as a collection of capabilities needed for a segment of production. A work segment is defined as a specific capability within the process segment, needed for the segment of production.

The ISA S95 standard lacks to distinguish production equipment from other equipment requirements used by sub-phases of the process segment itself. However, a selection of the production equipment influences also a selection of other equipment required for an execution of the process segment. For example, in a production plant there is a hierarchy of equipment and if the production process is addressed to a specific production line, also phases of the production process are almost always executed within the same production line.

If there is a lack in parting the production equipment for the work segment from the equipment requirements of the sub-phases, there is a high risk of being faced with potentially inconsistent equipment requirements. Specifically, an equipment requirements list is being used, which contains both a production equipment list needed to start the process segment as well as an equipment requirement list used to start a totality of the work segments associated to the process segment. This solution requires an excellent knowledge of the hierarchy of equipment of the plant in order to allocate the right equipment for the process segment and for its work segments. In particular it is important to determine an on-site availability of the production equipment for the process segment.

One goal to be achieved is to provide a method for selecting a totality of required equipment for each work segment and for starting the process segment, in other words distinguishing between the production equipment required by sub-phases of the work segment and equipment required for starting the process segment.

SUMMARY OF THE INVENTION

It is accordingly an object of the invention to provide a method for selecting equipment resources in a manufacturing process that overcome the above-mentioned disadvantages of the prior art methods and devices of this general type.

The goal is achieved according to the invention by a method for selecting equipment resources in a manufacturing process. The method includes creating an execution equipment list by retrieving out of a database, one piece of execution equipment required for starting a process segment. A list of available sub-equipments of the execution equipment is retrieved out of the database. Within the list of sub-equipments a check is made about availability of each of a totality of required equipments for each of a totality of work segments of the process segment respectively. The execution equipment is selected for the starting of the process segment. Each of the required equipments is selected for execution of each of the work segments respectively, in case the required equipment for the work segment is available. An output list is created and contains information about assignments of each of the required equipments to each of the work segments respectively in case all of the required equipments are available.

In accordance with an added mode of the invention, there is the step of choosing the execution equipment by selecting a production area located in a production plant.

In accordance with an additional mode of the invention, there is the step of retrieving the list of available sub-equipments based on a totality of components of the production area.

In accordance with a further mode of the invention, there is the step of performing the checking step by searching the list of available sub-equipments for an entry matching a function for each of the required equipments to a work type of each of the work segments respectively.

In accordance with another mode of the invention, there is the step of submitting the output list to a production scheduler in case the execution equipment for starting the process segment is available and in the case where each of the required equipments for each of the work segments of the process segment respectively, is available.

In accordance with a concomitant mode of the invention, there is the step of generating an error report in the case where at least one of the required equipments is missing in the list of available sub-equipments.

The main advantage of the present invention is a minimization of a risk of inconsistent selections of the required equipment and of the execution equipment.

Other features which are considered as characteristic for the invention are set forth in the appended claims.

Although the invention is illustrated and described herein as embodied in a method for selecting equipment resources in a manufacturing process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
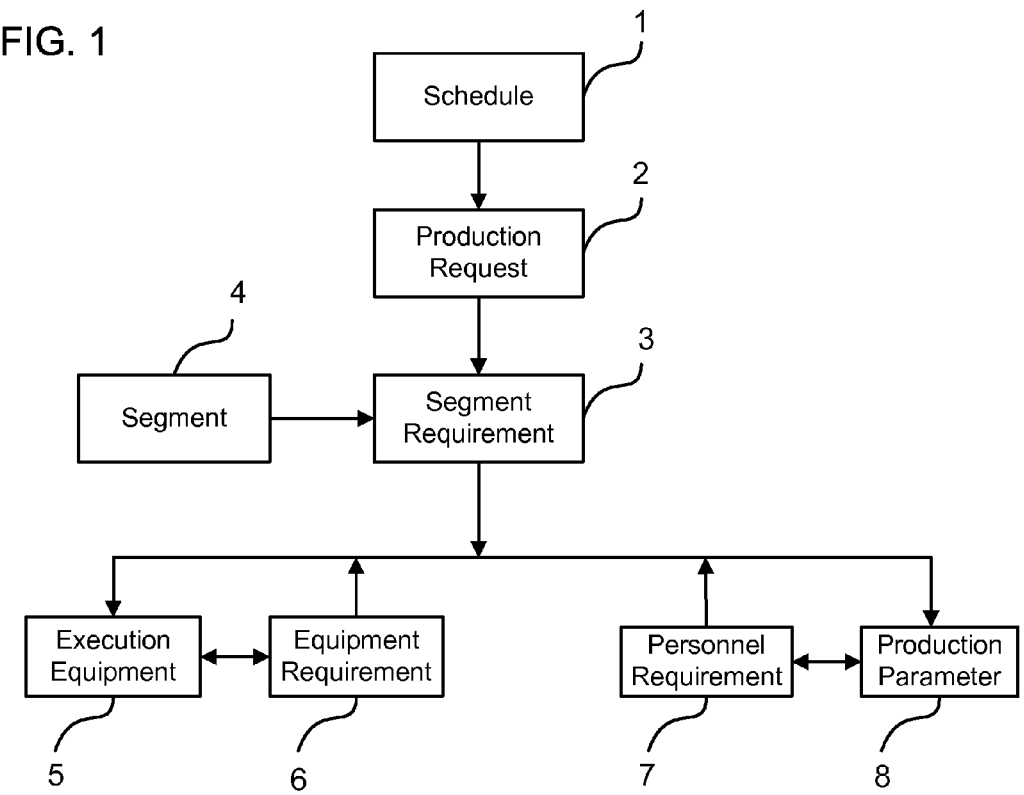
FIG. 1 is a diagram of a segment requirement associated to a process segment according to the invention.

Referring now to the drawings of the invention in detail, and in particular to FIG. 1 thereof, there is shown an example of a segment requirement. A production schedule 1 is made up of one production request 2. The production request 2 contains information required by manufacturing to fulfill a scheduled production, defined by one segment requirement 3. The segment requirement 3 corresponds to a process segment 4. The segment requirement 3 references a segment capability, in other words a totality of entities describing all work capabilities of a segment. In this example, the segment requirement 3 references execution equipment 5, an equipment requirement 6, a personnel requirement 7 and a production parameter 8. The production parameter 8 contains information required for correct production such as quality limits and specific customer requests. The personnel requirement 7 refers for example to number, type and duration of job classifications within the segment. The execution equipment 5 describes a high level equipment such as a production area and interacts with the equipment requirement 6, which contains specific equipment within the production area, for example a welding robot, a packaging machine, etc. Thus, the equipment requirement 6 describes in more detail a totality of production capabilities of the execution equipment.

Figure 2:
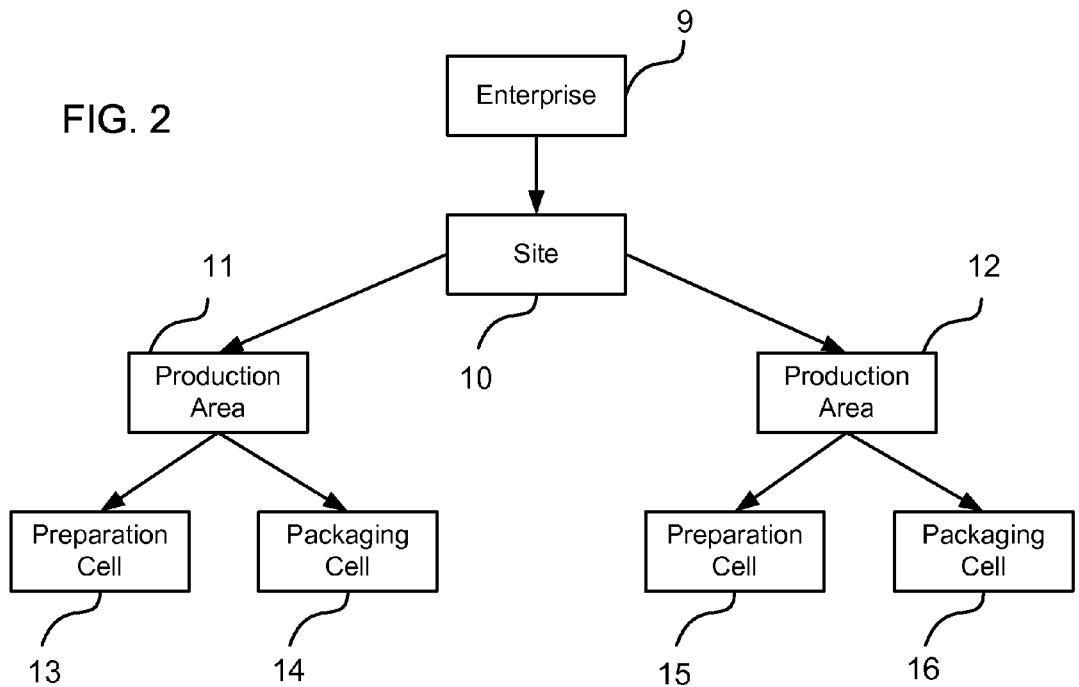
FIG. 2 is a diagram for a selection of required equipment and of execution equipment on a plant.

FIG. 2 shows in detail an example of a production equipment selection for a plant. An enterprise 9 is located on one site 10 which contains a first production area 11 and a second production area 12. In conjunction with FIG. 1, the first and the second production areas 11 and 12 denote two execution equipments 5. The first production area 11 is made up of a first preparation cell 13 and of a first packaging cell 14. The second production area 12 is made up of a second preparation cell 15 and of a second packaging cell 16. Taking the example described in FIG. 1, the preparation cells 13 and 15 and the packaging cells 14 and 16 describe the equipment requirement 6. For explanatory purposes it is assumed that a product on the site 10 located in the production area 11 should undergo a shipping preparation. In order to accomplish the shipping, two tasks to be carried out before shipping the product are identified: a preparation work segment and a packaging work segment. A module implementing the method according to the present invention searches the database in order to find equipment suitable for the two tasks. It finds the suitable equipment and selects it. As the ISA S95 standard lacks in specifying a dependence of the equipment requirement from its location, a prior art solution may choose the second preparation cell 15 and the second packaging cell 16, which, however, belong to the production area 12, although the two selected cells are located on the same site 10. Thus, the choice is inconsistent with the location of the product. Therefore, either the product must be redirected to the production area 12 or an operator with solid site knowledge has to manually correct the choice made by the prior art solution. This results in increasing costs and delays. The module implementing the method according to the present invention avoids this case by specifying an additional field in the ISA S95 standard, thus extending the ISA S95 standard, the field denoting the execution equipment 5, the execution equipment 5 being linked to the correct equipment requirement 6.

In this example, according to the invention, first the execution equipment list is created, which contains the production area 11 where the product is located and thus, where the shipping preparation, identified as the process segment 4, starts. In a second step, the list of available sub-equipments is retrieved, containing the first preparation cell 13 and the first packaging cell 14. This insures that only equipment which is available in the production area 11 is released for the assignments of each of the required equipments to each of the work segments. In a third step, the list of sub-equipments is checked to make sure that, in order to execute the preparation work segment, the required equipment 6 contains a preparation cell which in this case is found to be the preparation cell 13 and that in order to execute the packaging work segment, the required equipment 6 contains a packaging cell which in this case is found to be the packaging cell 14. In a fourth step, as the location of the product is in the production area 11, the production area 11 is selected as the execution equipment. In a fifth step, the preparation cell 13 and the packaging cell 14 are assigned to the preparation work segment and to the packaging work segment respectively. In a sixth step, the output list is created, containing the assignments, thus, the execution equipment equals the production area 11 and the required equipment equals the preparation cell 13 for the preparation work segment and the packaging cell 14 for the packaging work segment.

The execution equipment is chosen by selecting a production area located on a production plant. This advantageously allows a high degree of flexibility in a choice of execution locations. For example, a product is located on an unsuitable site for a next assembly step required for the product. Two assembly sites may be used for the assembly step. A production planner has the flexibility to choose which of the two assembly sites is suitable for the assembly step of the product. The choice of the planner may be based on a distance of the assembly sites from the product, on a present free capacity of each one of the two sites, etc.

The list of available sub-equipments is retrieved based on a totality of components of the production area. This advantageously insures that all capabilities of the production area 11 are taken into account. The totality of components is stored in the database and linked to the execution equipment.

The checking is done by searching the list of available sub-equipments for an entry matching a function for each of the required equipments to a work type of each of the work segments respectively. Beside the stored totality of components, also each detailed function of each component is stored in the database, allowing a fast retrieval of information about a purpose of a certain component as well as of detailed capabilities of the entire execution equipment.

According to a preferred method, the output list is submitted to a production scheduler in case the execution equipment for starting the process segment is available and in case each of the required equipments for each of the work segments of the process segment respectively, is available. As soon as all of the assignments have been cross checked, the output list is submitted to the production scheduler that coordinates the process segment. This has the advantage that the checking is decoupled from the production scheduler, allowing the scheduler to focus on other tasks, thus optimizing a workload of the scheduler.

An error report is generated in case at least one of the required equipments is missing in the list of available sub-equipments. This advantageously allows an easy detection of bottlenecks in advance, thus before any of the work segments have been triggered, thus allowing a search for alternative solutions.

A module implementing the method contains software code organized as a library which is importable into an existing software suite. This advantageously allows an integration of the method in an existing computer-controlled production system in an easy way.

The invention claimed is:

1. A method for selecting equipment resources in a manufacturing process, which comprises the steps of:
creating an execution equipment list by retrieving out of a database one execution equipment required for starting a process segment;
retrieving out of the database a list of available sub-equipments of the execution equipment;
checking within the list of available sub-equipments an availability of each of a totality of required equipments for each of a totality of work segments of the process segment respectively;
selecting the execution equipment for the starting of the process segment;
selecting each of the required equipments for execution of each of the work segments respectively, in a case where the required equipments for the work segment is available and on a location of a product to be processed; and
creating an output list containing information about assignments of each of the required equipments to each of the work segments respectively in a case where all of the required equipments are available.

2. The method according to claim 1, which further comprises choosing the execution equipment by selecting a production area located in a production plant.

3. The method according to claim 1, which further comprises retrieving the list of available sub-equipments based on a totality of components of the production area.

4. The method according to claim 1, which further comprises performing the checking step by searching the list of available sub-equipments for an entry matching a function for each of the required equipments to a work type of each of the work segments respectively.

5. The method according to claim 1, which further comprises submitting the output list to a production scheduler in case the execution equipment for starting the process segment is available and in the case where each of the required equipments for each of the work segments of the process segment respectively, is available.

6. The method according to claim 1, which further comprises generating an error report in the case where at least one of the required equipments is missing in the list of available sub-equipments.

7. A module, comprising:
software code program in a non-transitory computer readable medium, said software code programmed for selecting equipment resources in a manufacturing process, which comprises the steps of:
creating an execution equipment list by retrieving out of a database execution equipment required for starting a process segment;
retrieving out of the database a list of available sub-equipments of the execution equipment;
checking within the list of available sub-equipments an availability of each of a totality of required equipments for each of a totality of work segments of the process segment respectively;
selecting the execution equipment for the starting of the process segment;
selecting each of the required equipments for execution of each of the work segments respectively, in a case where the required equipments for the work segment is available and on a location of a product to be processed; and
creating an output list containing information about assignments of each of the required equipments to each of the work segments respectively in the case where all of the required equipments are available.

\* \* \* \* \*